US009265045B2

(12) United States Patent
Jin et al.

(10) Patent No.: US 9,265,045 B2
(45) Date of Patent: Feb. 16, 2016

(54) METHOD AND APPARATUS FOR ADJUSTING SIGNAL TRANSMISSION STARTING POINT OF TERMINAL IN WIRELESS NETWORK

(71) Applicant: Electronics and Telecommunications Research Institute, Daejeon (KR)

(72) Inventors: Sung-Geun Jin, Daejeon (KR); Kapseok Chang, Daejeon (KR); Hyoung Jin Kwon, Chungcheongbuk-do (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/463,703

(22) Filed: Aug. 20, 2014

(65) Prior Publication Data

US 2014/0355510 A1  Dec. 4, 2014

Related U.S. Application Data

(63) Continuation of application No. 13/391,622, filed as application No. PCT/KR2010/005561 on Aug. 20, 2010, now Pat. No. 8,837,457.

(30) Foreign Application Priority Data

Aug. 21, 2009 (KR) .................. 10-2009-0077490
Aug. 20, 2010 (KR) .................. 10-2010-0080713

(51) Int. Cl.
*H04H 20/71* (2008.01)
*H04W 72/04* (2009.01)
(Continued)

(52) U.S. Cl.
CPC ....... *H04W 72/0446* (2013.01); *H04L 65/4076* (2013.01); *H04W 56/0075* (2013.01); *H04W 74/00* (2013.01)

(58) Field of Classification Search
None
See application file for complete search history.

(56) References Cited

U.S. PATENT DOCUMENTS 6,405,047 B1 * 6/2002 Moon ........................ 455/456.1
7,006,534 B1    2/2006 Nemoto
(Continued)

FOREIGN PATENT DOCUMENTS

CN       1267969 A     9/2000
KR   2008-0063749 A    7/2008

OTHER PUBLICATIONS

B. Kim et al., "Feedback-assisted MAC protocol for real time traffic in high rate wireless personal area networks", in: High Rate Wireless Personal Area Networks, Springer, published online Jun. 17, 2009.
(Continued)

*Primary Examiner* — Minh-Trang Nguyen
(74) *Attorney, Agent, or Firm* — Rabin & Berdo, P.C.

(57) ABSTRACT

Disclosed is a method for adjusting a transmission time point of at least one second terminal in a wireless network by a first terminal. In the method for adjusting a transmission time point of a terminal, a transmission time point of the second terminal is set, a first frame including information regarding the transmission time point is transmitted to the second terminal, a first response frame transmitted according to the transmission time point from the second terminal is received, and the transmission time point is adjusted according to an arrival time of the first response frame.

7 Claims, 11 Drawing Sheets

(51) Int. Cl.
*H04W 56/00* (2009.01)
*H04W 74/00* (2009.01)
*H04L 29/06* (2006.01)

(56) References Cited

U.S. PATENT DOCUMENTS 8,837,457 B2 * 9/2014 Jin et al. ................ 370/350

2007/0014269 A1 1/2007 Sherman et al.
2009/0097439 A1 * 4/2009 Lee ........................ 370/328

OTHER PUBLICATIONS

K. Liu, "Performance Analysis of Prioritized MAC in UWB WPAN with Bursty Multimedia Traffic", IEEE Transactions on Vehicular Technology, vol. 57, No. 4, Jul. 2008, pp. 2462-2473.

* cited by examiner

METHOD AND APPARATUS FOR ADJUSTING SIGNAL TRANSMISSION STARTING POINT OF TERMINAL IN WIRELESS NETWORK

BACKGROUND OF THE INVENTION (a) Field of the Invention

The present invention relates to a method and apparatus for adjusting transmission time of a terminal in a wireless network.

(b) Description of the Related Art

In line with the advancement in information communication technology, various wireless communication techniques are being developed. Among them, a wireless local area network (WLAN) uses a technique of allowing a user to wirelessly access the Internet at homes, in offices, or in a particular service providing area by using a terminal based on a radio frequency technique. A wireless personal area network (WPAN) uses a technique for wirelessly connecting devices within a relatively short distance to allow for data transmission and control. The WPAN includes, for example, Bluetooth™, ZigBee™, ultra-wide band (UWB), and the like.

In a wireless network environment such as the WLAN, the WPAN, and the like, a plurality of terminals operate independently. Thus, in order for the terminals to cooperatively communicate within the wireless network, a technique that may causes signals transmitted by the plurality of independently operating terminals reach a particular terminal at the same time point is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for adjusting time points at which a plurality of independently operating terminals transmit signals in a wireless network.

An exemplary embodiment of the present invention provides a method for adjusting, by a first terminal, a transmission time point of at least one second terminal in a wireless network, the method comprising: setting a transmission time point of the second terminal and transmitting a first request frame including information on the transmission time point to the second terminal; receiving a first response frame transmitted according to the transmission time point from the second terminal; and adjusting the transmission time point based to an arrival time of the first response frame.

Another embodiment of the present invention provides a method for synchronous transmission of a terminal in a wireless network, the method comprising: transmitting a first request frame including transmission time point information to a plurality of terminals that independently operate; receiving first response frames transmitted according to the transmission time point information from the plurality of terminals; calculating an arrival time of each of the first response frames; adjusting the transmission time point information such that the difference between the arrival time and an estimated arrival time is within an allowable error range; and retransmitting a second request frame including the adjusted transmission time point information to the plurality of terminals.

Yet another embodiment of the present invention provides a terminal including: a wireless communication unit transmitting a request frame including transmission time point information with respect to a plurality of terminals to the plurality of terminals and receiving response frames transmitted from the plurality of terminals according to the transmission time point information; and a controller calculating the difference between an actual arrival time and an estimated arrival time of each of the response frames, adjusting the transmission time point information by reflecting the difference, and configuring a request frame such that the request frame includes the adjusted transmission time point.

According to exemplary embodiments of the present invention, signals transmitted by a plurality of terminals that operate independently in a wireless network can arrive at a particular terminal at the same time point. Therefore, cooperative communication can occur, and the terminal receiving the signals from the plurality of terminals can obtain good reception performance.

DETAILED DESCRIPTION OF THE EMBODIMENTS

Figure 1:
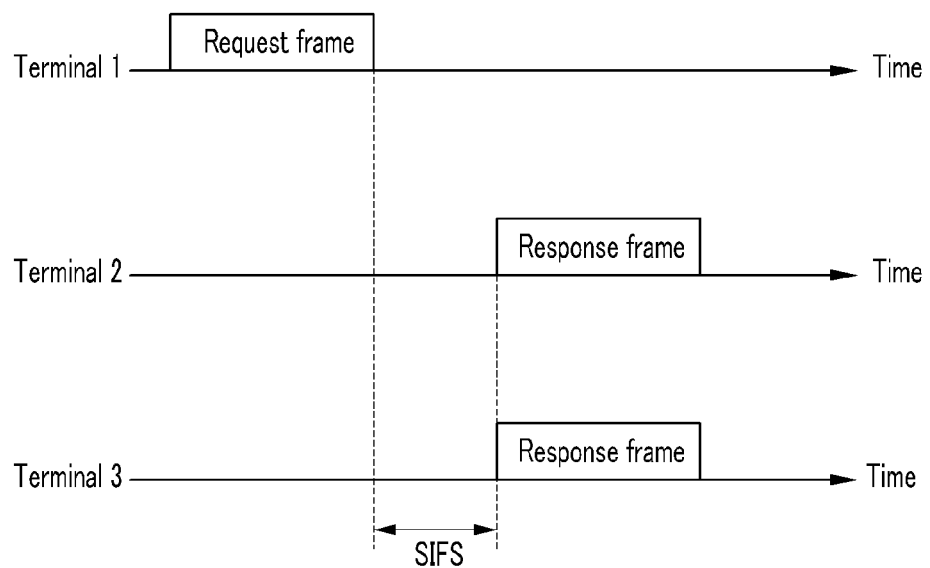
FIG. 1 is a view illustrating transmission of signals by a plurality of terminals to a common terminal in a wireless network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the present disclosure, a terminal may be referred to as a mobile station (MS), a mobile terminal (MT), a subscriber station (SS), a portable subscriber station (PSS), user equipment (UE), an access terminal (AT), and the like, or may include entire or partial functions of the MS, MT, SS, PSS, UE, AT, and the like.

In the present disclosure, an access point (AP) may be referred to as a base station (BS), a radio access station (RAS), a Node B, an evolved Node B (eNodeB), a base transceiver station (BTS), a mobile multihop relay (MMR)-BS, and the like, and include the entire or partial functions of the BS, RAS, Node B, eNodeB, BTS, MMR-BS, and the like.

FIG. 1 is a view illustrating transmission of signals by a plurality of terminals to a common terminal in a wireless network.

With reference to FIG. 1, terminal 1 transmits a request message to terminals 2 and 3. The request message may be transmitted in a multicast or broadcast manner. The terminals 2 and 3 transmit a response message with respect to the request message, respectively. In this case, the terminals 2 and 3 use a short inter-frame space (SIFS) for synchronous transmission. That is, when the terminals 2 and 3 receive the request message from the terminal 1, they transmit the response message with respect to the request message after the lapse of SIFS.

Here, the synchronous transmission refers signals being transmitted by a plurality of terminals (e.g., the terminals 2 and 3), which independently operate, simultaneously arriving at a common terminal (e.g., the terminal 1) within a certain error range. The plurality of terminals transmitting signals to the common terminal by using synchronous transmission may also be called synchronous transmission terminals. Such a synchronous transmission may be applicable to cooperative communication using a relay, and in this case, one of the terminals 2 and 3 may serve as a relay.

In this case, the SIFS may have a certain margin of error. For example, the SIFS may have a margin of error within a range of approximately +10% to −10% in one slot time. Assuming that the SIFS is 10 µs and one slot time is 20 µs, the SIFS may have a value ranging from 8 µs to 12 µs. Thus, there may be a time difference of a maximum of 4 µs between a time at which the signal transmitted by the terminal 2 arrives at the terminal 1 and a time at which the signal transmitted by the terminal 3 arrives at the terminal 1. In this respect, in an orthogonal frequency division multiplexing (OFDM) system, because the length of a cyclic prefix (CP) is 800 ns, the difference between the time at which the signal from the terminal 2 arrives and the time at which the signal from the terminal 3 arrives may be longer than the length of the CP. Thus, the terminal 1 may have difficulty in precisely restoring the signals commonly received from the terminals 1 and 2. Therefore, a novel method for adjusting transmission time points of terminals is required in order to make the signals transmitted by the plurality of terminals, which independently operate, simultaneously arrive at the common terminal.

Figure 2:
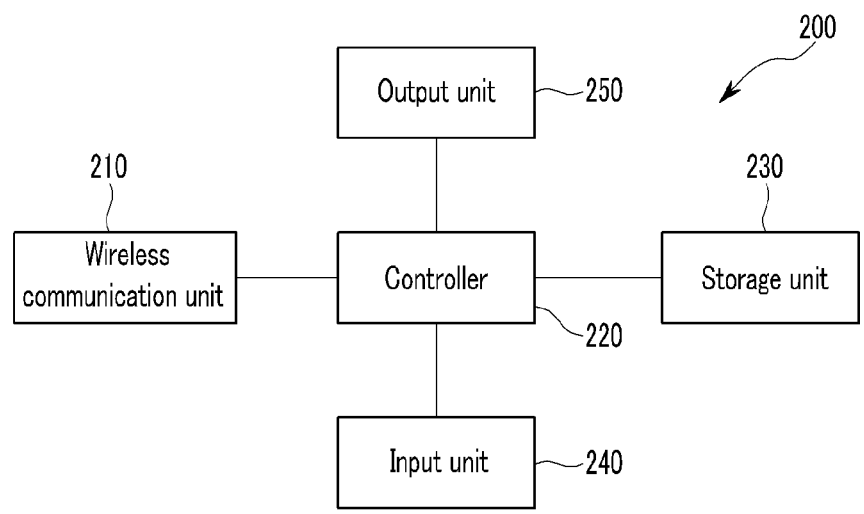
FIG. 2 is a schematic block diagram of a terminal according to an exemplary embodiment of the present invention.
Figure 3:
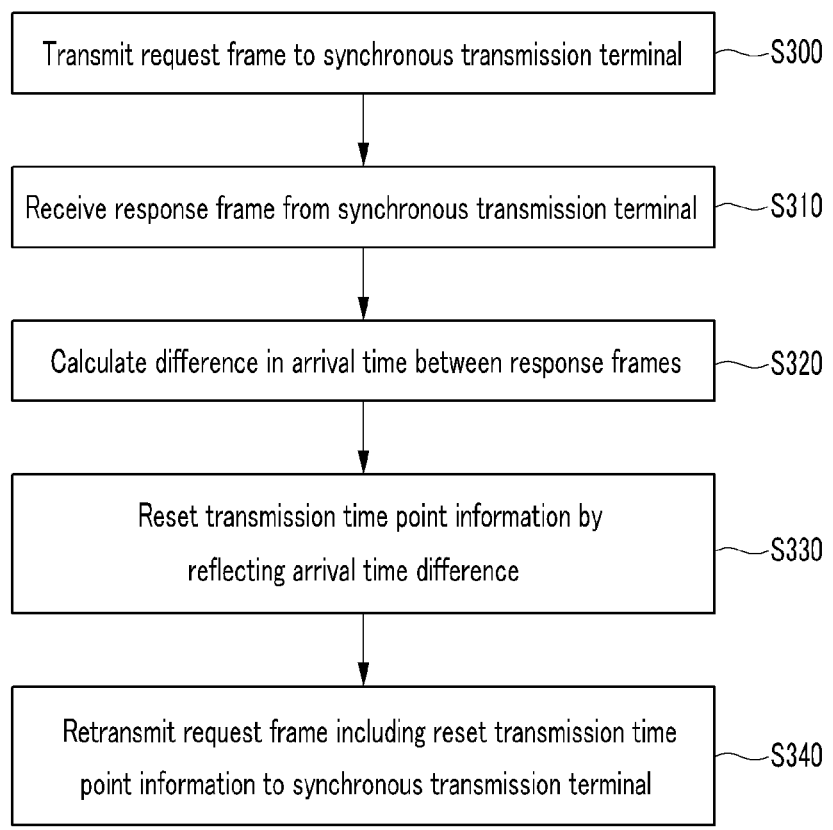
FIG. 3 is a flowchart illustrating the process of a method for adjusting transmission time points of terminals according to an exemplary embodiment of the present invention.

FIG. 2 is a schematic block diagram of a terminal according to an exemplary embodiment of the present invention, and FIG. 3 is a flowchart illustrating the process of a method for adjusting transmission time points of terminals according to an exemplary embodiment of the present invention.

With reference to FIG. 2, a terminal 200 includes a wireless communication unit 210, a controller 220, a storage unit 230, an input unit 240, and an output unit 250.

The wireless communication unit 210 performs a wireless communication function of the terminal 200. The wireless communication unit 210 may include an RF unit for transmitting and receiving a radio frequency (RF) signal.

The controller 220 controls the general operation of the terminal 200. The controller 220 may include a data processing unit for coding and modulating a transmitted signal or demodulating and decoding a received signal.

The storage unit 230 stores programs for operating the controller 220, and inputted or outputted data.

The input unit 240 receives data or information for controlling operations of the terminal from the user.

The output unit 250 displays information processed in the terminal 200 as various types of signals (e.g., audio signal, visual signal, etc.) to the user.

With reference to FIGS. 2 and 3, the wireless communication unit 210 of the terminal 200 transmits a request frame for adjusting transmission time points to a plurality of synchronous transmission terminals (S300). The request frame includes information regarding a transmission time point at which the synchronous transmission terminals is to transmit a response frame. The transmission time point information may be previously set. The request frame may be multicast or broadcast to the plurality of synchronous transmission terminals, or may be separately transmitted to the plurality of synchronous transmission terminals.

The synchronous transmission terminals transmit a response frame based on the transmission time point, respectively, and the wireless communication unit 210 of the terminal 200 receives the response frames from the plurality of synchronous transmission terminals (S310). The controller 220 of the terminal 200 calculates the difference in arrival time of the response frames (S320). The difference in arrival time may be calculated, for example, by using a preamble included in each of the response frame.

The controller 220 of the terminal 200 resets the transmission time point information by reflecting the difference in arrival time (S330). The wireless communication unit 210 of the terminal 200 retransmits a request frame including the reset transmission time point information to the plurality of synchronous transmission terminals (S340). The steps S310 to S340 may be repeatedly performed until such time as the difference in arrival time of the response frames is within an allowable error range.

Figure 4:
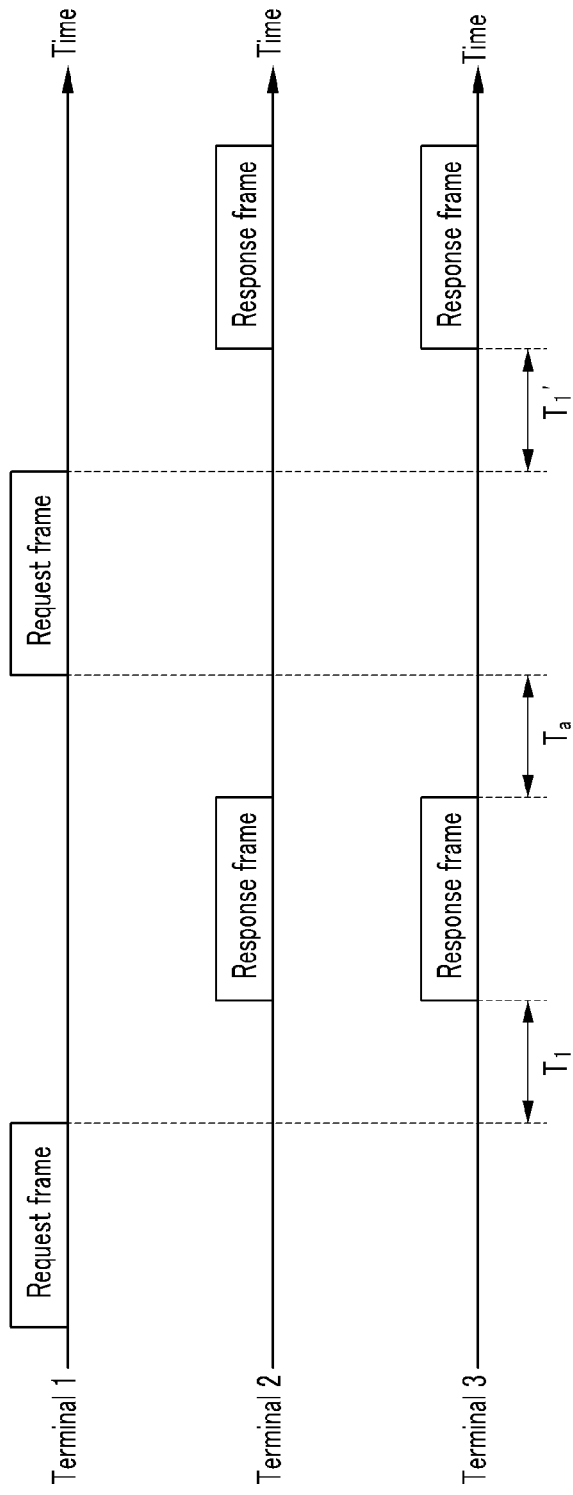
FIGS. 4 and 5 are views illustrating adjusting, by a common terminal, time points of signal transmissions of a plurality of synchronous transmission terminals according to an exemplary embodiment of the present invention.
Figure 5:
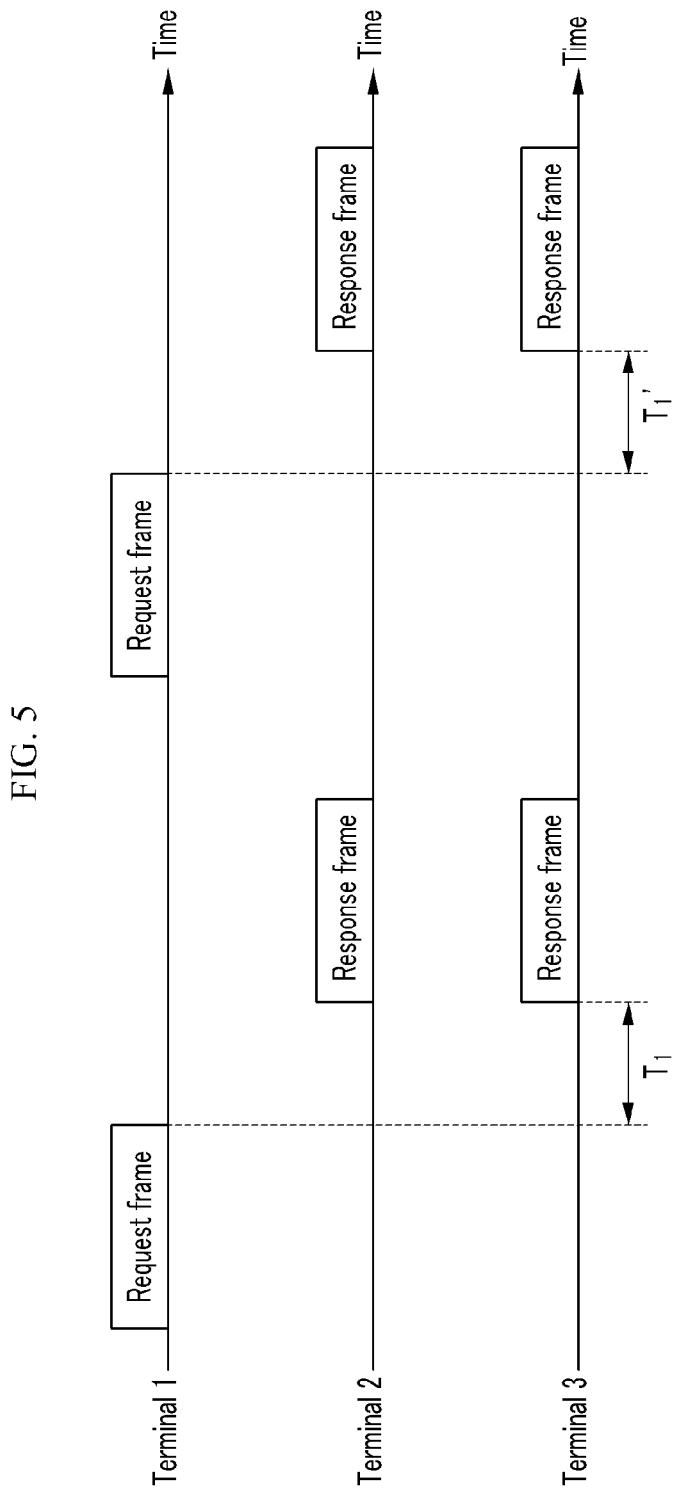
Figure 6:
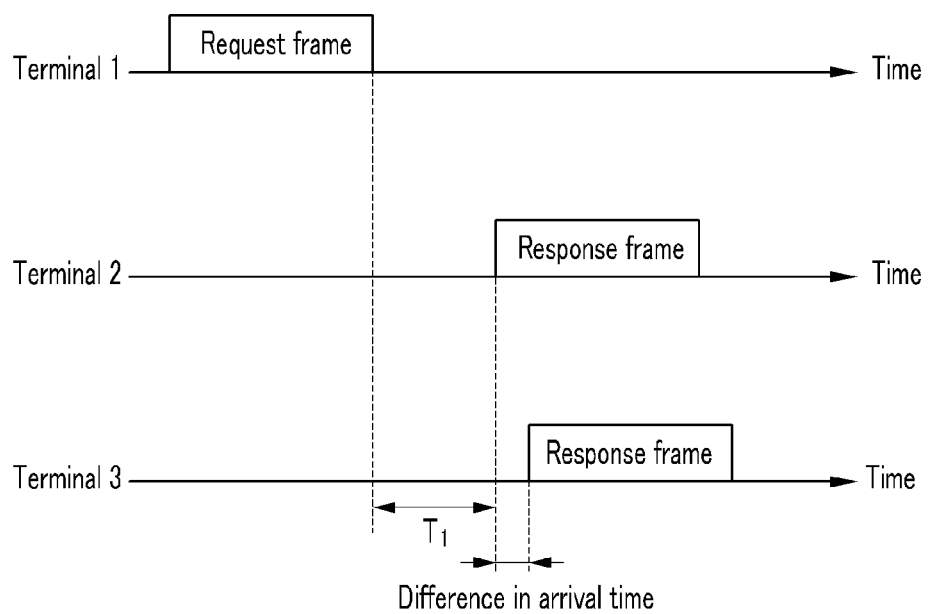
FIG. 6 is a view illustrating time points at which signals transmitted by the synchronous transmission terminals according to the exemplary embodiments of FIGS. 4 and 5 arrive at the common terminal.

FIGS. 4 and 5 are views illustrating adjusting, by a common terminal, time points of signal transmissions of a plurality of synchronous transmission terminals according to an exemplary embodiment of the present invention, and FIG. 6 is a view illustrating time points at which signals transmitted by the synchronous transmission terminals according to the exemplary embodiments of FIGS. 4 and 5 arrive at the common terminal.

With reference to FIGS. 4 and 5, the terminal 1 transmits a request frame including transmission time point information to the terminals 2 and 3, and the terminals 2 and 3 transmit a response frame after the lapse of a certain time interval $T_1$ according to the transmission time point information. In the case illustrated in FIG. 4, after the terminal receives the response frame, it successively transmits the request frame after the lapse of a certain time $T_a$. In contrast, in the case illustrated in FIG. 5, the terminal 1 receives the response frame, and when a new transmission opportunity is allocated after the lapse of a certain time, the terminal 1 again transmits a request frame. In the case illustrated in FIG. 4, no other terminal may be involved while the terminal 1 adjusts the transmission time points with the terminals 2 and 3.

The locations of the terminals 2 and 3 or communication environments of the terminals 2 and 3 may be different. Thus, as shown in FIG. 6, although the terminals 2 and 3 simultaneously transmit a response frame, respectively, there may be a difference between time points at which the response frames of the terminals 2 and 3 arrive at the terminal 1, respectively. Thus, the terminal 1 adjusts the time points at which the terminals 2 and 3 are to transmit the response frames by reflecting the difference in arrival time, and retransmits a request frame including information regarding the adjusted transmission time point to the terminals 2 and 3. Upon receiving the request frame, the terminals 2 and 3 retransmit a response frame after the lapse of the time interval according to the adjusted transmission time point, respectively. Accordingly, the terminal 1 can receive the response frame after the lapse of the adjusted time interval $T_1'$. The process may be repeatedly performed until such time as the difference in arrival time is within an allowable error range.

Figure 7:
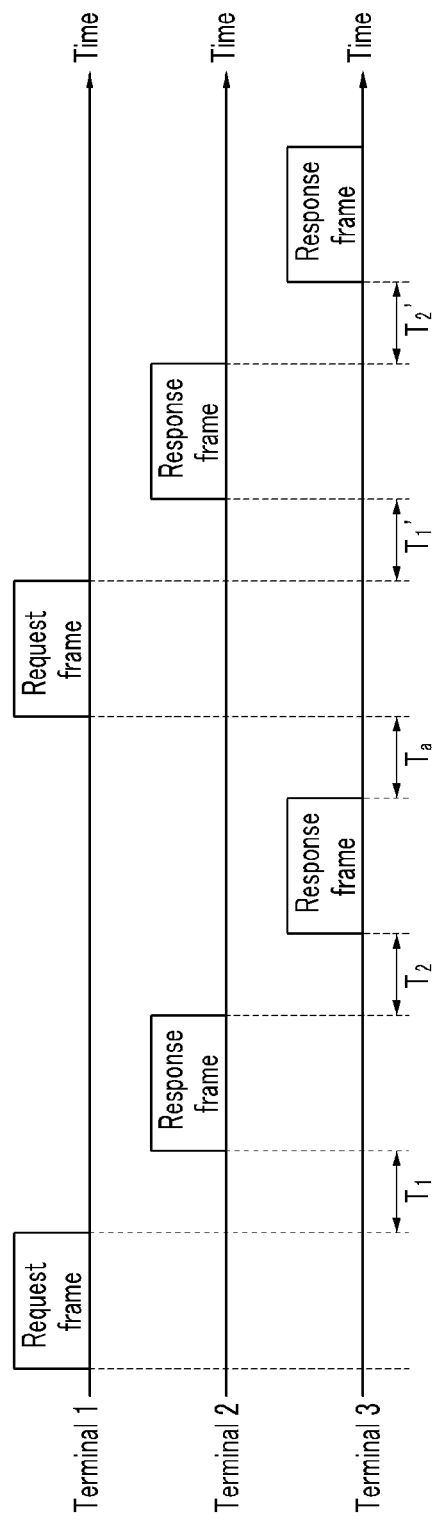
FIGS. 7 and 8 are views illustrating adjusting, by a common terminal, transmission time points of a plurality of synchronous transmission terminals according to another exemplary embodiment of the present invention.
Figure 8:
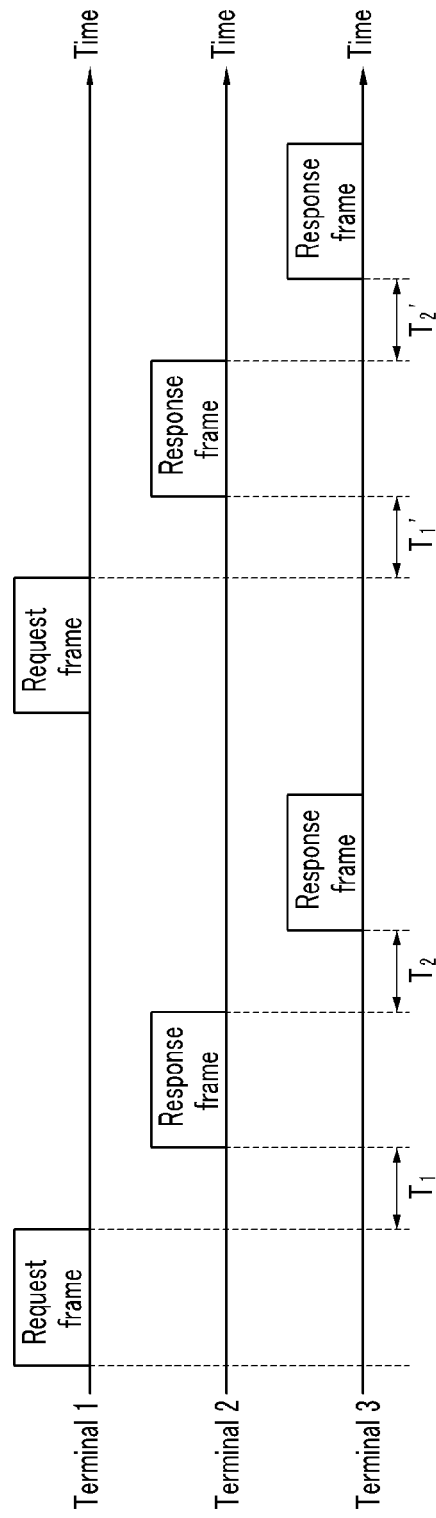
Figure 9:
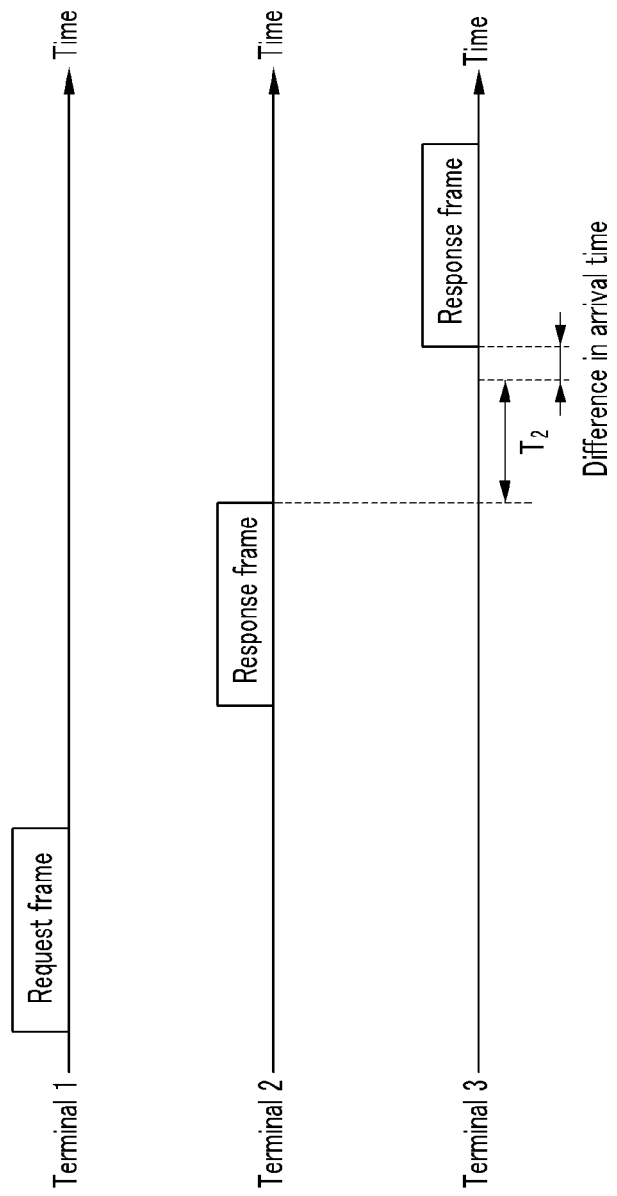
FIG. 9 is a view illustrating time points at which signals transmitted by the synchronous transmission terminals according to the exemplary embodiments of FIGS. 7 and 8 arrive at the common terminal.

FIGS. 7 and 8 are views illustrating adjusting, by a common terminal, transmission time points of a plurality of synchronous transmission terminals according to another exemplary embodiment of the present invention, and FIG. 9 is a view illustrating time points at which signals transmitted by the synchronous transmission terminals according to the exemplary embodiments of FIGS. 7 and 8 arrive at the common terminal.

With reference to FIGS. 7 and 8, the terminal 1 transmits a request frame for adjusting a transmission time point to the terminals 2 and 3, and the terminals 2 and 3 transmit a response frame at a response time allocated by the terminal 1, respectively. For example, the terminal 1 may allocate a response time, that is, a transmission time point, such that the terminal 2 can transmit a response frame after the lapse of time $T_1$ from the request frame, and allocate a response time such that the terminal 3 can transmit a response frame after the lapse of time $T_2$ from the response frame. Then, the terminals 2 and 3 can transmit a response frame after the lapse of the allocated response time, respectively. In the case illustrated in FIG. 7, after the terminal 1 receives the response frame, it successively transmits a request frame after the lapse of a certain time $T_a$. In contrast, in the case illustrated in FIG. 8, after the terminal 1 receives the response frame, it again transmits a request frame when a new transmission opportunity is allocated after the lapse of a certain time. In the case illustrated in FIG. 7, no other terminal may be involved while the terminal 1 adjusts the transmission time points with the terminals 2 and 3.

As shown in FIG. 9, although the terminals 2 and 3 transmit a response frame at the allocated response time, respectively, there may be an error in time at which the response frames arrive at the terminal 1. For example, the difference between the actual arrival time of the response frame transmitted from the terminal 2 and the actual arrival time of the response frame transmitted from the terminal 3 may be different from a difference $T_2$ in the estimated arrival time. Then, the terminal 1 resets the response time, that is, the transmission time points, of the terminals 2 and 3 by reflecting the difference in arrival time, and retransmits a request frame including information regarding the reset response time. Upon receiving the request frame, the terminals 2 and 3 may retransmit a response frame after the lapse of the allocated response time, respectively. This process may be repeatedly performed until such time as the difference in arrival time is within an allowable error range.

Figure 10:
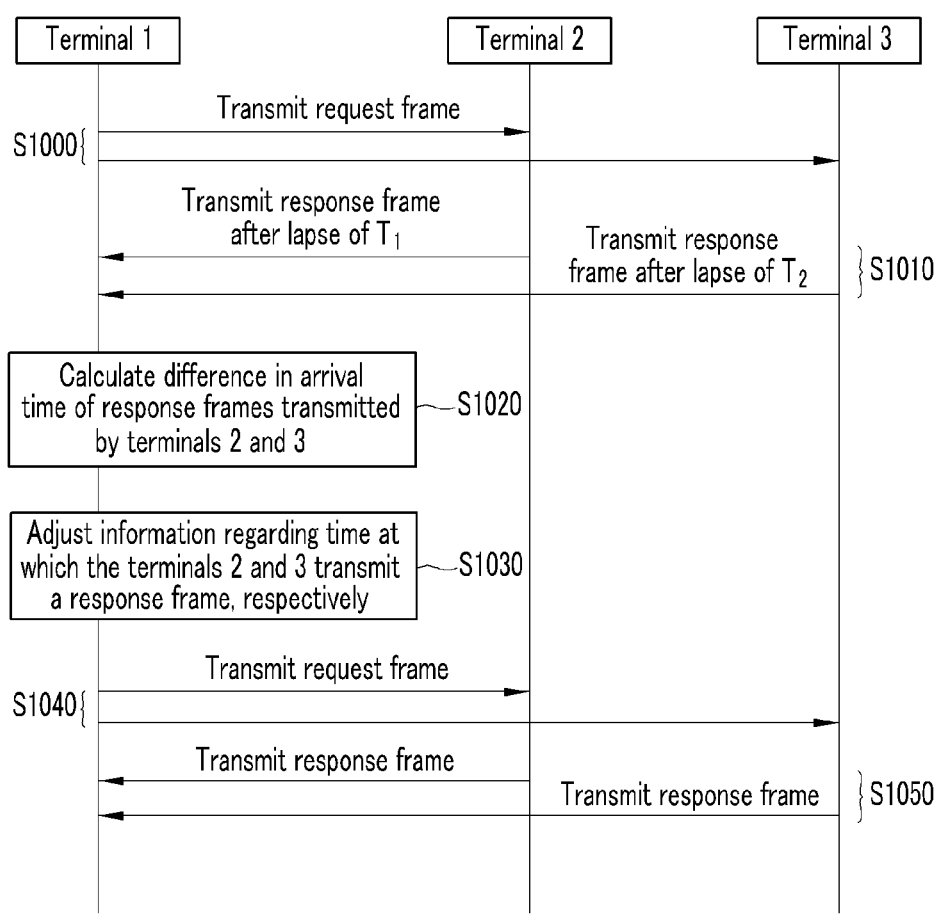
FIG. 10 is a flowchart illustrating the process of a method for adjusting a signal transmission time point by the common terminal and the plurality of synchronous transmission terminals according to an exemplary embodiment of the present invention.

FIG. 10 is a flowchart illustrating the process of a method for adjusting a signal transmission time point by the common terminal and the plurality of synchronous transmission terminals according to an exemplary embodiment of the present invention.

With reference to FIG. 10, the terminal 1 transmits request frames for adjusting transmission time points to the terminals 2 and 3 (S1000). The request frames may include information regarding transmission time points of response frames of the terminals 2 and 3. The information regarding the transmission time points of the response frames may be a certain time interval $T_1$ from a time point at which the request frame is transmitted to a time point at which a response frame is to be transmitted, and the certain time interval $T_1$ may be previously set.

The terminals 2 and 3 transmit a response frame to the terminal 1, respectively, after the lapse of the certain time interval $T_1$ (S1010). In this case, the terminals 2 and 3 may acquire a synchronization time point by using a preamble included in each of the request frames received from the terminal 1, and start a timer based on the synchronization time point. The terminals 2 and 3 may transmit a response frame, respectively, by using the individually allocated preamble after the lapse of a predetermined time.

The terminal 1 calculates the difference between an arrival time of the response frame transmitted by the terminal 2 and an arrival time of the response frame transmitted by the terminal 3 (S1020). The response frames transmitted by the terminals 2 and 3 include a preamble, respectively, distinguished by terminals. Thus, the terminal 1 can calculate the difference in arrival time by performing a correlation operation on the preambles included in the response frames.

The terminal 1 adjusts information regarding transmission time points of the response frames of the terminals 2 and 3 by reflecting the difference in arrival time (S1030), and transmits request frames including the adjusted information to the terminals 2 and 3 (S1040).

Here, an example of the adjusted information may include information regarding a synchronous transmission terminal as a reference terminal, information regarding a synchronous transmission terminal as a non-reference terminal, and the information regarding difference in arrival time of the synchronous transmission terminals (or transmission time point adjustment information). Here, the synchronous transmission terminal as a reference terminal may be one of a synchronous transmission terminal of which a response frame has arrived first, a synchronous transmission terminal of which a response frame has arrived at a time closest to an average value, and a synchronous transmission terminal of which a response frame has arrived latest.

Another example of the adjusted information may include information regarding the respective synchronous transmission terminals and the difference value in arrival time between the respective synchronous transmission terminals (or transmission time point adjustment information).

Still another example of the adjusted information may include information regarding the respective synchronous transmission terminals and the difference value in arrival time of the respective synchronous transmission terminals over an average arrival time of all the synchronous transmission terminals (or transmission time point adjustment information).

The terminals 2 and 3 may transmit a response frame to the terminal 1 according to the adjusted information, respectively (S1050), and the terminal 1 repeatedly performs steps S1020 to S1040 until such time as the difference in arrival time is within an allowable error range.

Figure 11:
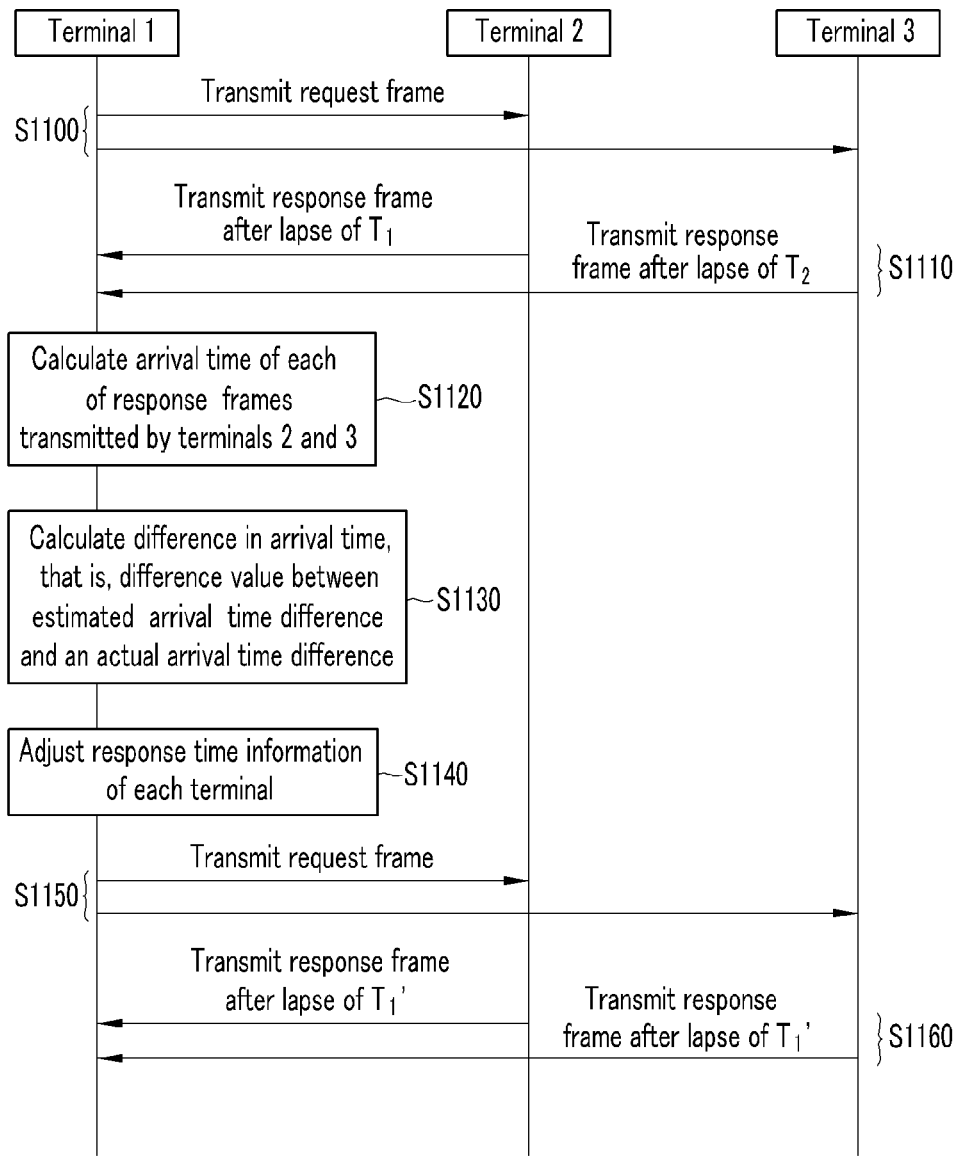
FIG. 11 is a flowchart illustrating the process of a method for adjusting a signal transmission time point by the common terminal and the plurality of synchronous transmission terminals according to another exemplary embodiment of the present invention.

FIG. 11 is a flowchart illustrating the process of a method for adjusting a signal transmission time point by the common terminal and the plurality of synchronous transmission terminals according to another exemplary embodiment of the present invention.

With reference to FIG. 11, the terminal 1 transmits request frames for adjusting transmission time points to the terminals 2 and 3 (S1100). The request frames may include a response time allocated to each terminal, that is, transmission time point information. For example, the terminal 1 may allocate the response time, that is, a transmission time point, such that the terminal 2 can transmit a response frame after the lapse of time $T_1$ from the request frame, and allocate the response time such that the terminal 3 can transmit a response frame after the lapse of time $T_2$ from the response frame of the terminal 2.

The terminals 2 and 3 transmit response frames to the terminal 1 at the respective allocated response time (S1110). In this case, the terminals 2 and 3 may acquire a synchronization time point by using a preamble included in each of the request frames received from the terminal 1, and start a timer based on the synchronization time point. The terminals 2 and 3 may transmit a response frame, respectively, by using the individually allocated preamble after the lapse of a predetermined time. The preambles individually allocated to the terminals 2 and 3 may be the same or different.

The terminal 1 calculates an arrival time of each of the response frames transmitted by the terminal 2 and the terminal 3 (S1120). The terminal 1 can calculate the arrival time of each of the response frames by performing a correlation operation on the preambles included in the response frames.

The terminal 1 calculates the arrival time difference in by using the calculated arrival time (S1130). In this case, as illustrated in FIGS. 7 to 9, the arrival time difference may be a difference value between an estimated arrival time difference and an actual arrival time difference.

The terminal 1 adjusts information regarding transmission time points with respect to a response time allocated to each terminal by reflecting the difference in arrival time (S1140), and transmits request frames including the adjusted transmission time information to the terminals 2 and 3 (S1150).

Here, an example of the adjusted transmission time point information may include information regarding a synchronous transmission terminal as a reference terminal, information regarding a synchronous transmission terminal as a non-reference terminal, and the information regarding difference in arrival time of the synchronous transmission terminals (or transmission time point adjustment information). Here, the synchronous transmission terminal as a reference terminal may be one of a synchronous transmission terminal of which a response frame has arrived first, a synchronous transmission terminal of which a response frame has arrived at a time closest to an average value, and a synchronous transmission terminal of which a response frame has arrived latest.

Another example of the adjusted transmission time point information may include information regarding the respective synchronous transmission terminals and information regarding the difference in arrival time (or transmission time point adjustment information).

The terminals 2 and 3 transmit a response frame to the terminal 1 according to the adjusted information (S1160), and the terminal 1 may repeatedly perform the steps S1120 to S1150 until such time that the difference in arrival time is within an allowable error range.

The exemplary embodiments of the present invention as described are not implemented only through a device or a method, but may be implemented through a program that can realize a function corresponding to the configuration of the exemplary embodiments of the present invention or a recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for adjusting, by a first terminal, a transmission time point of a relay, and a second terminal performing cooperative communication with the first terminal, the method comprising:
    transmitting a first request frame for transmitting time-point adjusting to the relay;
    transmitting a second request frame for transmitting time-point adjusting to the second terminal;
    receiving a first response frame from the relay;
    receiving a second response frame from the second terminal;
    calculating a time difference between an estimated arrival time and an actual arrival time for the first response frame and the second response frame; and
    adjusting transmitting time point of the relay using the time difference for the first response frame and the time difference for the second response frame.

2. The method of claim 1, further comprising
    retransmitting the first request frame to the relay based on an adjusted transmitting time point.

3. The method of claim 1, wherein the first request frame includes a transmitting time point for the relay.

4. The method of claim 1, wherein the first terminal receives the first response frame from the relay and the second response frame from the second terminal, such that the first response frame and the second response frames do not overlap with each other.

5. The method of claim 1, wherein the first terminal receives the first response frame, after time T1 from an end of the first request frame, and receives the second response frame, after time T2 from an end of the second request frame.

6. A method for adjusting, by a first terminal, a transmission time point of a relay, and second terminal performing cooperative communication with the first terminal, the method comprising:
    transmitting a first request frame to the relay;
    transmitting a second request frame to the second terminal;
    receiving a first response frame from the relay at a first time corresponding to the first request frame;
    receiving a second response frame from the second terminal at a second time, different from the first time, corresponding to the second request frame;
    adjusting a transmitting time point of the relay using a time difference between an estimated arrival time and an actual arrival time for the first response frame and the second response frame; and
    retransmitting the first request frame to the relay based on the adjusted transmitting time point.

7. A first terminal performing cooperative communication with a relay and a second terminal comprising:
    a processor configured to:
        transmit a first request frame for transmitting time-point adjusting to the relay;
        transmit a second request frame for transmitting time-point adjusting to the second terminal;
        receive a first response frame from the relay;

receive a second response frame from the second terminal;

calculate a time difference between an estimated arrival time and an actual arrival time for the first response frame and the second response frame;

adjust a transmitting time point of the relay using the time difference for the first response frame and the time difference for the second response frame.

\* \* \* \* \*